Aug. 16, 1966  H. B. CARR  3,266,517
GATE VALVE FOR USE IN HOT BLAST LINES
Filed Feb. 12, 1964  4 Sheets-Sheet 1

INVENTOR
HUGH B. CARR.
BY
Christy, Parmelee & Strickland
ATTORNEYS.

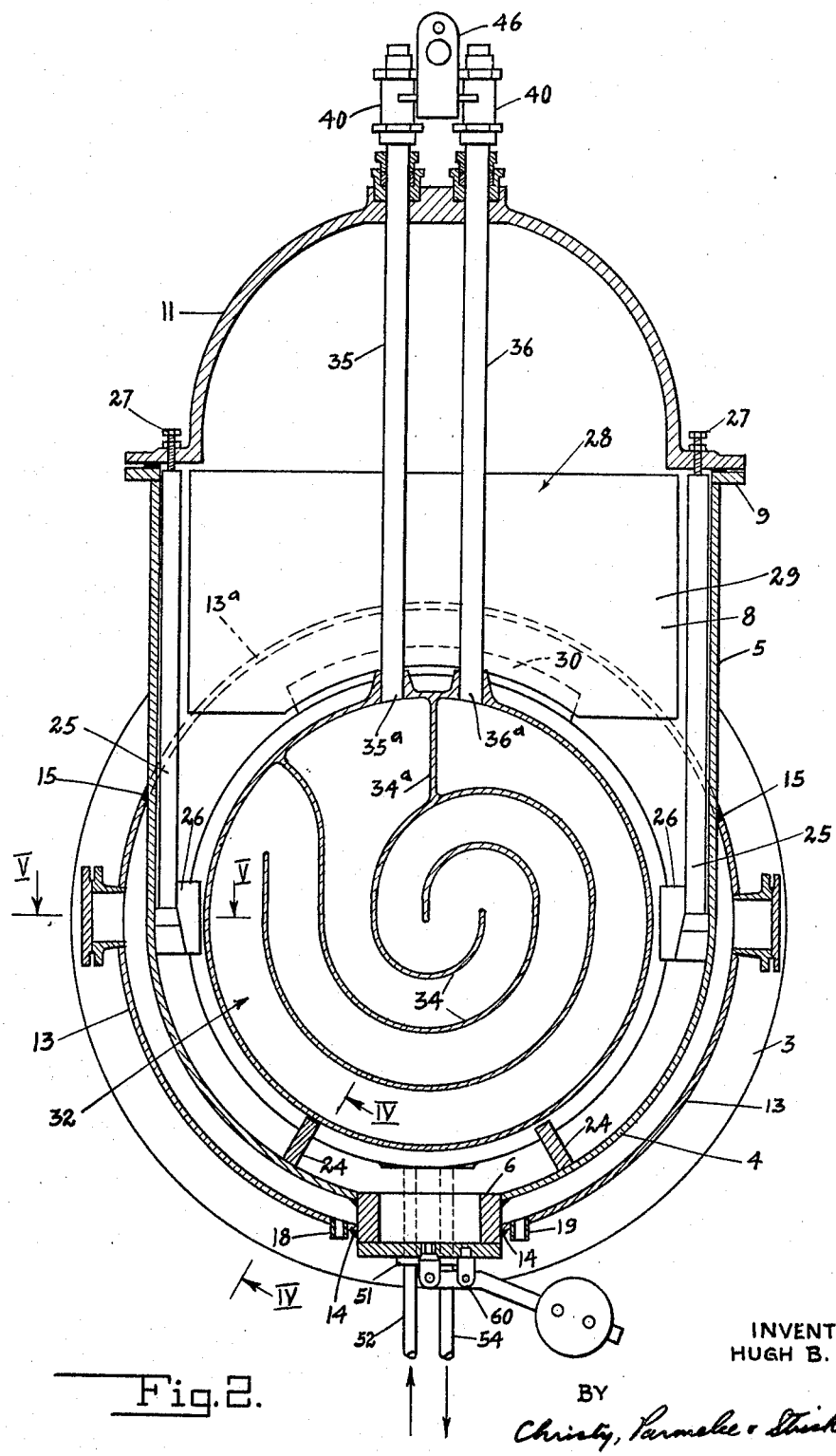

INVENTOR.
HUGH B. CARR.

Aug. 16, 1966   H. B. CARR   3,266,517
GATE VALVE FOR USE IN HOT BLAST LINES
Filed Feb. 12, 1964   4 Sheets-Sheet 4

INVENTOR
HUGH B. CARR.
BY
Christy, Parmelee, Strickland
ATTORNEYS.

United States Patent Office 3,266,517
Patented August 16, 1966

1

3,266,517
GATE VALVE FOR USE IN HOT BLAST LINES
Hugh B. Carr, Carnegie, Pa., assignor to S. P. Kinney Engineers, Inc., Carnegie, Pa., a corporation of Pennsylvania
Filed Feb. 12, 1964, Ser. No. 344,319
9 Claims. (Cl. 137—340)

This invention is for a valve of the type having a gate or valve disk movable transversely of the passageway through the valve into and out of closed position, and relates specifically to such a valve designed for use in a pipe line, such as the hot blast line of a blast furnace plant or similar environment where the flow of highly heated gases is to be controlled.

Valves for this purpose generally have water-cooled rings against which the valve disk seats, and from time to time these rings must be replaced. One object of the present invention is to provide a valve from which these rings can be removed and replaced by removal of the valve bonnet, making it unnecessary, as is now the case, to take the valve entirely out of the line and then remove the rings endwise from the passage through the valve, replace them with others, and then restore the entire valve, which weighs many hundred pounds, to the line.

A further object of this invention is to provide a unique construction for clamping and holding the water-cooled seating rings in place.

A further object of the invention is to provide a water-cooled valve body of novel construction which may be of fabricated steel construction.

Other objects are to provide a valve gate which is effectively water-cooled, and to provide packing for the valve stems which are water-circulating pipes that permit limited movement of the stems transversely of their lengths so as to avoid flexing of the stems inside the valve body as the valve disk is urged by gas pressure against one sealing ring or the other.

These and other objects and advantages are provided by my invention, which may be more fully understood by reference to the accompanying drawings, and the following description. In the drawings:

FIG. 2 is a vertical section in the plane of line II—II of FIG. 3;

Figure 1:
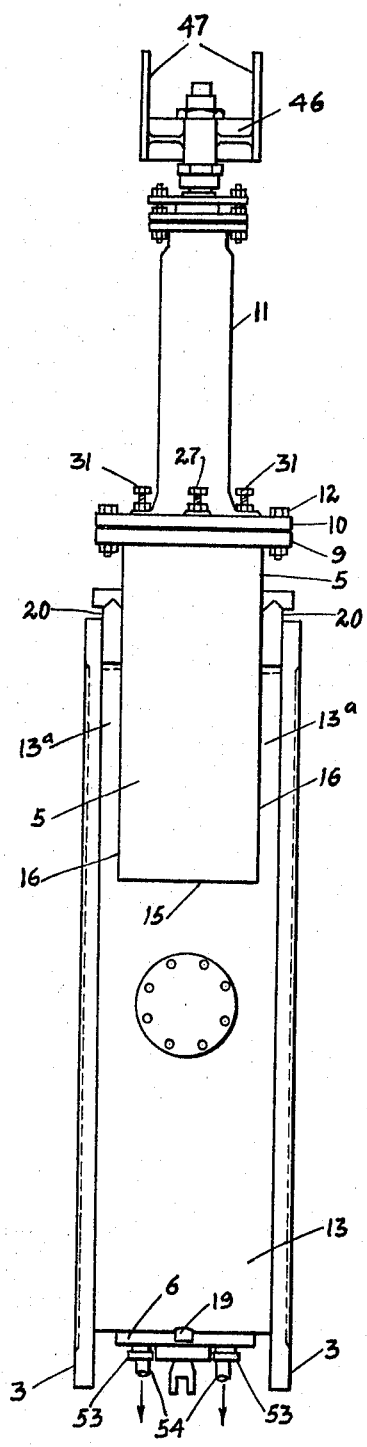
FIG. 1 is a side elevation of a valve embodying the invention.

In the drawings, the valve body is shown fabricated from steel by welding. It comprises two complete ring sections 2 (see FIG. 3) in spaced axial alignment. Each has an outer end plate forming an annular flange 3 welded to its outer edge for connecting the valve body into a hot blast line. Between the confronting edges of these spaced rings there is a U-shaped piece having a lower semi-circularly-curved portion 4 concentric with the flanges 3, but of larger inner diameter, and which has upwardly-projecting parallel side plate portions 5 extending tangentially therefrom (see FIG. 2). At the bottom of the curved portion 4 there is welded a block 6.

There are two plates 7 which I term inner end plates, shaped to the contour defined by the U-shaped piece and welded to the opposite edges of this piece and welded to the inner edges of the rings 2. These plates have openings therethrough in register with the passageway within the valve body. They are in planes parallel with the flanges 3, and like the flanges 3 they project inwardly toward the center of the valve body slightly past the rings 2. The parts 4–5 with the plates 7 form a generally U-shaped enclosure with the lower portion concentric with the body rings 2 and a vertically-extending straight-sided chamber 8 into which the valve disk, hereinafter described, is retracted when the valve is open. On the top edge of this enclosure there is welded a flange 9 to which the flange 10 of a separate bonnet 11 is secured by bolts 12.

Figure 4:
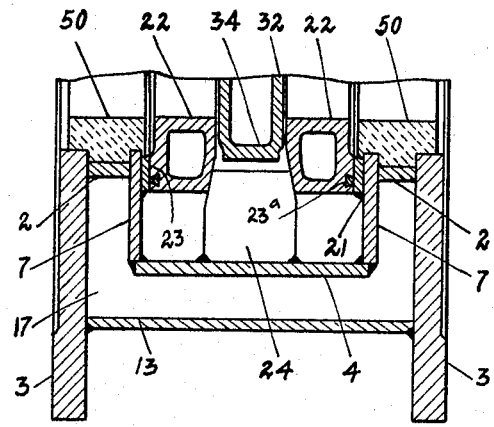
FIG. 4 is a fragmentary transverse section in the plane of line IV—IV of FIG. 2, but on a larger scale.
Figure 5:
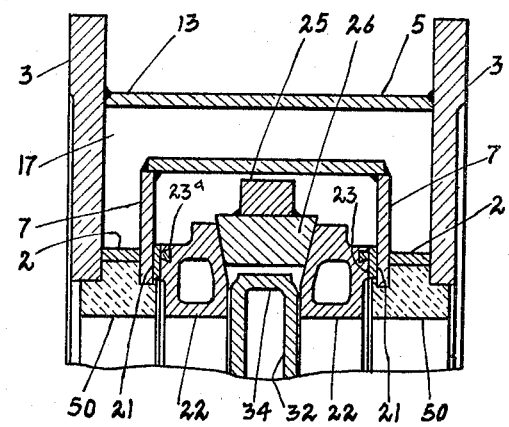
FIG. 5 is a similar section in the plane of line V—V of FIG. 2, but on a larger scale.

There is an outer casing 13 concentric with and spaced from the U-shaped plate 4. It is welded at 14 to the block 6. It is fully circular, having narrow band portions 13a best seen in FIG. 1, with the tangential upward extensions 5 interrupting the circular continuity of the plate 13 between the portions 13a. The outer casing 13 is welded to the extensions 5 at 15, and there is a weld at 16 where the inner end plates 7 meet the edges of the circular portions 13a. By this construction there is provided a water chamber 17 which, except for the block 6, is fully circular about the body rings 2, and which as seen in FIGS. 4 and 5 is the full distance between the end flanges 3 between parts 4 and 13 below the level of the welds 15. Near the bottom of the valve body there are two pipe nipples, 18 and 19, providing for the connection of water supply and water outlet pipes. In the top of the valve body each of the rings 2 has an air vent 20 to which a vent valve (not shown) may be attached.

Those faces of the plates 7 which are turned toward each other are each provided with a circular sealing band 21 that extends entirely around the opening through the plates 7 radially removed from the innermost edge of the opening. Each band has its face machined to a smooth flat surface. There are two circular, hollow, water-cooled seating rings 22, preferably formed of copper, concentric with the opening or passage in the valve body, each ring setting against the band 21 of each plate 7. Each ring has a flat raised surface 23 that bears against the confronting band 21 on the plates 7. As best seen in FIG. 4, this raised surface has a resilient heat-resistant sealing ring 23a inserted in an undercut or dovetailed groove in the surface 23. Such a sealing gasket may be formed of a well-known type of silicone resin. The sealing gasket is protected from the heat by being mounted in the water-cooled sealing ring and confined against the water-cooled inner plate 7.

The rings 22, which may be removed for repair or replacement, are at all times that the valve is in operation wedged into sealing relation with the bands 21 constituting a permanent part of the valve body. This wedging is effected in the lower portion of the valve body by two spaced wedge blocks or chocks 24 welded to the plate 4, one at each side of center. The wedge effect is best seen in FIG. 4 where the upstanding fixed wedge has tapered side edges that bear against chamfered surfaces of the seating rings 22, tending to force them tightly into position against the plates 7.

Inside each of the vertical extensions 5 of the plate 4 there is a vertical bar 25 having a wedge 26 at its lower end. Wedge jacking screws 27 on the bonnet urge these bars down so that as best seen in FIG. 5 the wedge blocks 26, at diametrically opposite points, are forced between the water-cooled seating rings 22 to press these rings at these locations into sealing contact with the sealing bands 21 of the plates 7.

Figure 3:
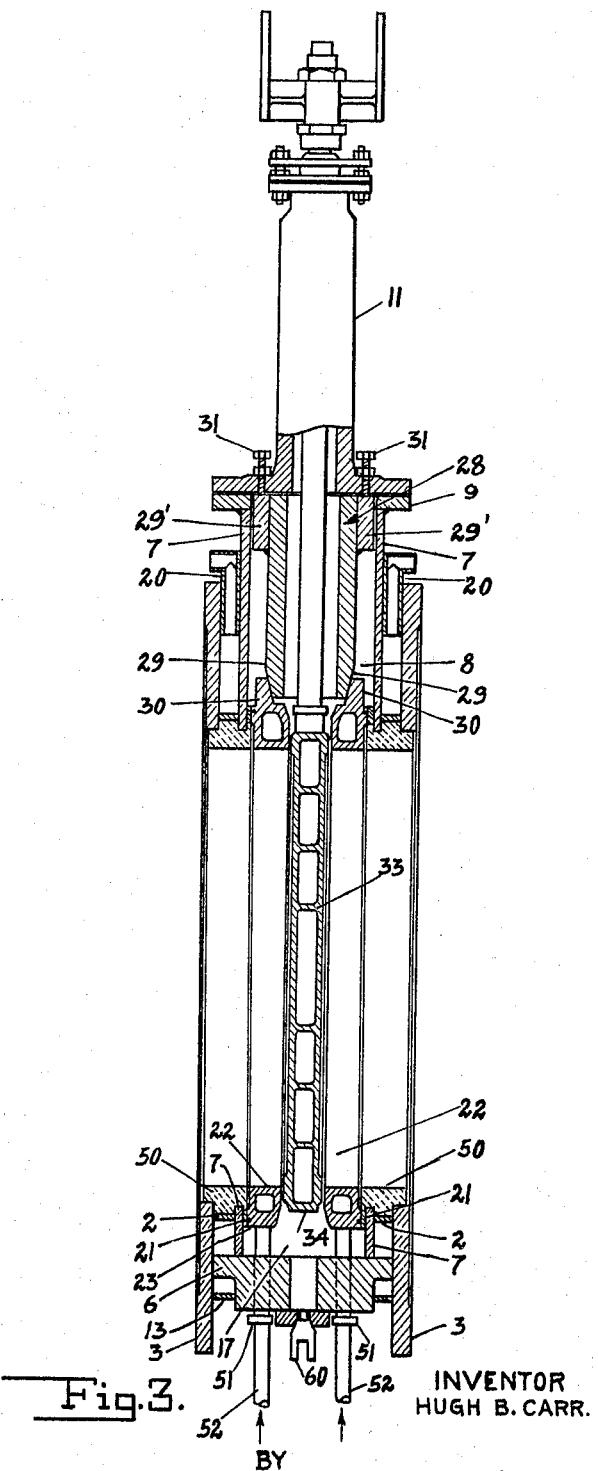
FIG. 3 is a vertical transverse section in the plane of line III—III of FIG. 2.

In the top of the valve body there is a keeper wedge 28 best seen in FIG. 3 having two rigidly joined but spaced side plates 29, the outer lower edges of which are beveled and are engaged between the tapered faces of arcuate flanges 30 on the tops of water-cooled seat rings 22, these flanges extending each side of the vertical center line of the valve and having downwardly-sloping inner faces against which the beveled edges of the two keeper wedge plates 29 bear for wedging the seat rings against the sealing surfaces or bands 21 of the body plates 7. The keeper wedge frame extends up close to the bottom of the bonnet 11 (see Fig. 3) and is thickened at the top by welding thereto strips 29' which are on the outside of the plates 29. Set screws or jack screws 31 passing through the bonnet exert downward pressure on the keeper wedge frame to exert the required wedging action on the seating rings. The rings are thus held in place at the top each side of center by the keeper wedge plates; at each end of the horizontal diameter by wedges 26 on bars 25, and at each side of the vertical center at the bottom by fixed wedge blocks 24.

The valve disk itself is designated generally as 32 and it has a close sliding fit between the confronting faces of the two seating rings 22. It is a hollow disk with two side faces 33 thickened at the periphery and having an annular peripheral wall 33a connecting them. Inside the disk between the two walls there is a double spiral vane structure 34. The operating stem for raising and lowering the disk comprises two tubular rods or pipes 35 and 36, one each side of the vertical center line as viewed in Fig. 2. Stem 35 terminates at 35a into one entrance of the double spiral vane at the periphery of the disk, and stem 36 passes through the periphery of the disk at 36a on the opposite end of the passage provided by the double spiral. Vertical vane 34a separates the two passages. The arrangement is such that water may be forced down one pipe 35 to the center of the spiral and then out pipe 36. This provides a directional continuous current flow of cooling water that assures good cooling of the entire disk with no stagnant areas.

Figure 6:
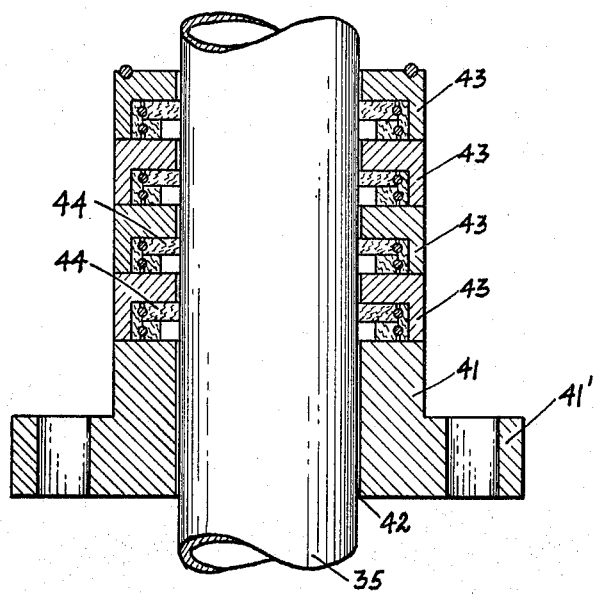
FIG. 6 is a fragmentary vertical section showing one of the valve stem stuffing boxes.
Figure 7:
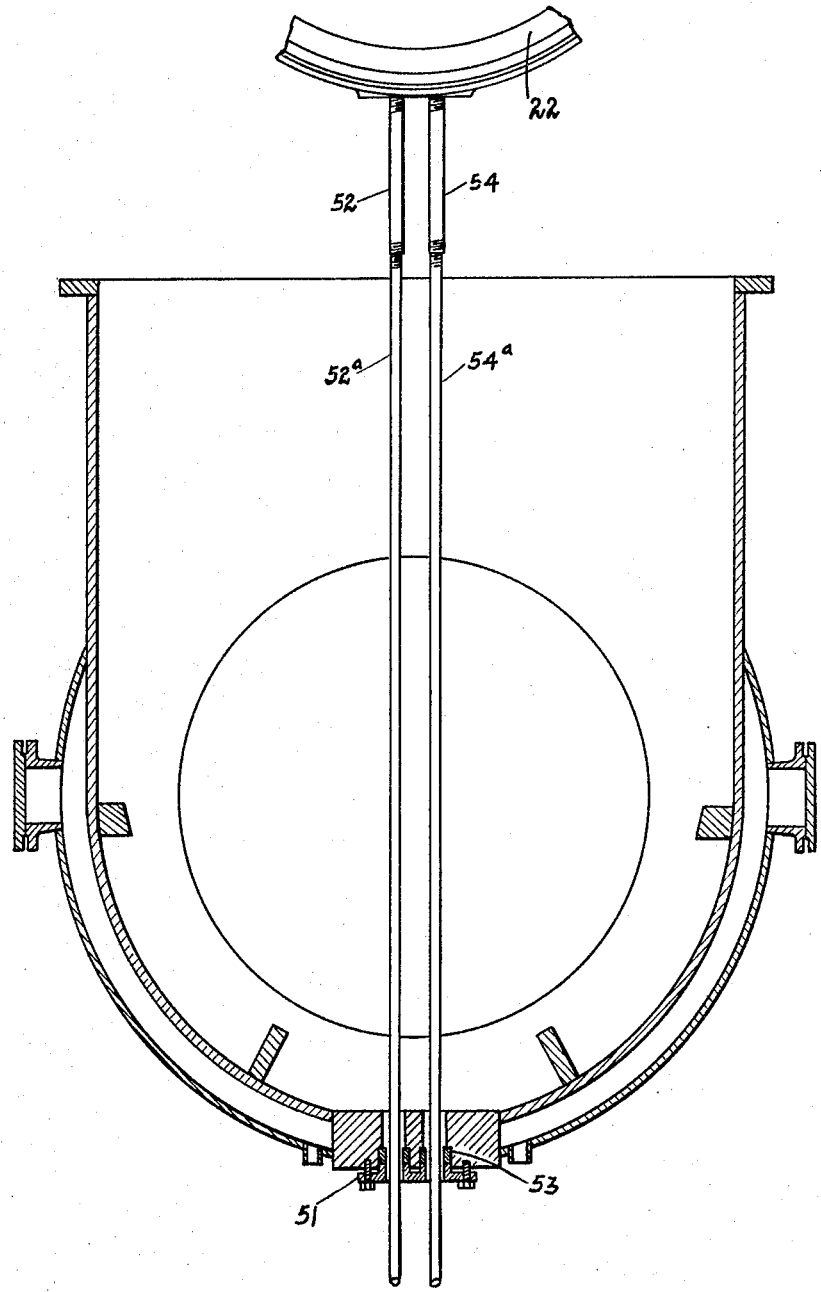
FIG. 7 is a view similar to FIG. 2 showing the bonnet and cooling ring removed and the manner of connecting water pipes to a cooling ring during replacement.

The tubular valve stems pass through separate stuffing boxes, each designated 40 in the top of the bonnet. These stuffing boxes, as best seen in Fig. 6, comprise a cylindrical extension 40 with a pad 41 at its base bolted to the top of the bonnet. There is an axial bore 42 through the extension of slightly larger diameter than the valve stem. Above the bore on the top of the extension are a plurality of rings 43, each with a rabbetted under surface forming a labyrinth with packing elements 44 therein. This stuffing box which per se is well known, has a particular advantage in this environment because it allows slight transverse movement of the stem in the stuffing box, so that when gas pressure is applied to one surface or the other of the valve disk when the valve is closed, the disk may move under such pressure against the seating ring on the low pressure side of the disk to form a tight seal without flexing the valve stems inside the bonnet.

The top ends of the valve stems are connected together by a yoke 46 to which operating links 47 are attached for moving the stems and valve disk vertically, the operating mechanism which is not shown being either manual or motor-driven.

There is a refractory lining 50 each side of the valve disk molded into the valve passage between the seating rings and the outer ends of the body, this refractory being held in place by reason of the flanges 3 and the plates 7 extending radially inward beyond the rings 2, forming an annular internal channel into which the refractory is keyed.

The block 6 in the bottom of the valve has four packing glands therein. One gland, 51, is for pipe 52 for introducing water into one of the seating rings, and one gland 53 is for a water discharge pipe 54 leading from the same ring. There is a transverse dam (not shown) inside the ring between these two pipes so that water entering pipe 52 must flow around the ring to flow out pipe 54. In a similar way the other two glands are for pipes for the cooling water for the other seating ring.

There is a weight-biased valve in the bottom of block 6 which is normally closed, and which is indicated at 60 and best seen in FIG. 3. By opening this valve, dust, condensate or other foreign matter which collects in the space at the bottom of the valve between the seat rings can be blown out, or when the valve is flushed to clean it, the water and foreign material which it carries may be drained through this valve.

Since it is a purpose of this valve to permit the seating rings to be removed and replaced without taking the valve out of the hot blast main, and while the valve is still hot, the removal of the seating rings is effected by removing the bonnet with the valve stems and depending disk, lifting this assembly vertically clear of the valve body. Then wedge frame 28 is lifted out and bars 25 with wedges 26 are lifted out. The way is then clear for the water cooling pipes 52 and 54 to the seating rings to be disconnected from the permanent piping and the seating rings lifted out through the open top of the valve. Since the tangential side plates 5 are spaced apart a distance greater than the diameter of the rings 22 there is ample clearance for this operation. To replace the seating rings, the first ring is brought to position above the valve body and a temporary water circulating pipe 52a is run up through the valve body from the bottom and connected to pipe 52, and a similar temporary pipe 54a is run up through the bottom and connected to the discharge pipe 54 of the ring. Water is passed through the pipes and ring as it is lowered into place. Since the temperature in the valve body may at this time be above 1000° F., it is important that water cooling be maintained with little interruption during the replacement of the seating ring. The second ring is replaced in the same way, and the usual water flow connections are re-established. The side bars 25 and wedges are replaced; the top wedge frame 28 is replaced, and then the valve disk and bonnet assembly is brought back and lowered into position. The bonnet is bolted in place; jack screws 27 and 31 are adjusted, and the valve is then on the line ready for service.

While I have shown and described a specific embodiment of my invention, it will be understood that various changes and modifications may be made within the contemplation of my invention and under the scope of the following claims.

I claim:

1. A gate valve for use in hot blast lines comprising a body providing a circular passageway therethrough, the body having an enclosure extending upwardly therefrom crosswise of the passageway with sides tangential to the circular passageway, the distance between the sides being at least as great as the full diameter of the passageway, a pair of spaced inner end plates extending transversely within the body each having an opening therethrough in line with the passageway of the full diameter of the passageway, a water-cooled seating ring positioned against each inner plate with two rings confronting but spaced from each other, means in the body for wedging the rings apart against the respective inner end plates against which they bear the wedging means for the seating rings comprising fixed wedge blocks in the body between the two inner end plates against which the lower portions of the seating rings bear and by which the lower portions of the seating rings are held against the faces of the inner plates, the wedging means also comprising a wedge frame received in said vertical extension and removable therefrom when the bonnet is removed, said wedge frame having a wedge portion fitted between the upper faces of the two seating rings for holding the upper portions of the seating rings against the faces of the inner end plates, pipe connections on the rings passing through the body for circulating water therethrough, a removable bonnet on the top of the enclosure, a valve disk in the body movable from a closed position between the seating rings where it extends across the passageway upwardly into the enclosure and bonnet to an open position, and operating stem means on the valve disk extending upwardly through the bonnet, said seating rings being removable vertically from the body through the enclosure when the bonnet and disk are removed and being replaceable by lowering them vertically through the enclosure into position in the body.

2. A gate valve as defined in claim 1 in which the bonnet has adjusting screws bearing against the wedge frame for adjustably forcing it down between the upper portions of the seating rings.

3. A gate valve as defined in claim 1 in which the bonnet has adjusting screws bearing against the wedge frame for adjustably forcing it down between the upper portions of the seating rings, means on the bonnet for urging the wedge frame down between the upper portions of the seating rings, the wedging means further comprising a pair of removable wedge elements in the enclosure, one at each side of the enclosure engaging the surfaces of the seating rings at each side of the valve body intermediate the said fixed wedges and the wedge portion of the removable wedge frame.

4. A gate valve as defined in claim 1 wherein said pipe connections on the rings comprise separate inlet and outlet pipes on each ring, said inlet pipe on each ring being near the bottom at one side of the vertical diameter of the passage and the outlet pipe on each ring being similarly located on the opposite side of said diameter, the valve body having a block at the bottom thereof with four glands therein positioned to engage the pipes on the sealing rings and through which the pipes may slide vertically when the seating rings are being lifted out or lowered into place.

5. A gate valve as defined in claim 1 wherein said pipe connections on the rings comprise separate inlet and outlet pipes on each ring, said inlet pipe on each ring being near the bottom at one side of the vertical diameter of the passage and the outlet pipe on each ring being similarly located on the opposite side of said diameter, the valve body having a block at the bottom thereof with four glands therein positioned to engage the pipes on the sealing rings and through which the pipes may slide vertically when the seating rings are being lifted out or lowered into place, the valve body having spaced inner and outer walls around the passageway which in conjunction with the inner and outer plates define a cooling water-circulating space, said block forming an obstruction across said space against continuous circulation of cooling water around the space, the outer wall having a water inlet connection adjacent the block at one side and a water outlet connection adjacent the block at the other whereby water entering the inlet connection to said space must circulate around the valve to reach the water outlet connection therefrom.

6. A gate valve as defined in claim 5 wherein the inner end plates which are water-cooled by the circulation of water through said space are provided with annular seat-forming ridges on the confronting faces thereof, each water-cooled seating ring having a face thereon that seals against the ridge of the inner end plate against which it bears, said last-named face having an annular ring therein with a yieldable gasket that contacts the ridge of an inner end plate against which the ring bears whereby the ring is confined between two water-cooled surfaces.

7. A gate valve as defined in claim 1 wherein said pipe connections on the rings comprise separate inlet and outlet pipes on each ring, said inlet pipe on each ring being near the bottom at one side of the vertical diameter of the passage and the outlet pipe on each ring being similarly located on the opposite side of said diameter, the valve body having a block at the bottom thereof with four glands therein positioned to engage the pipes on the sealing rings and through which the pipes may slide vertically when the seating rings are being lifted out or lowered into place, the valve body having spaced inner and outer walls around the passageway defining a cooling water-circulating space, said block forming an obstruction across said space against continuous circulation of cooling water around the space, the outer wall having a water inlet connection adjacent the block at one side and a water outlet connection adjacent the block at the other whereby water entering the inlet connection to said space must circulate around the valve to reach the water outlet connection therefrom, the valve disk being hollow to define a closed circular interior, the interior of the disk having spaced spiral vanes therein defining a water passage from the periphery of the disk to the center and a second passage from the center toward the periphery, said valve disk having a connection opening into each passage at the top edge of the disk, the operating stem means for operating the disk comprising vertical parallel tubes, one opening into one connection and one into the other, said tubes extending in a direction opposite the pipes on the cooling ring, the ends of said tubes outside the bonnet having connections for connecting them to a water-circulating system.

8. A gate valve structure fabricated principally of plate metal parts comprising a pair of spaced annuli, each having a flange plate at its opposite ends and each having an inner end plate on the confronting ends, which plates confront each other but are in spaced parallel planes, said inner end plates having openings therethrough concentric with the axis of the two annuli and each having a semicircular lower portion and a straight-sided upper portion extending tangentially from the lower portion, a central inside plate element of generally U-shaped form welded to the peripheral edges of the two inner end plates to provide a central body section of the valve which has a semicircular lower portion and a tangential extension forming an enclosure extending upwardly from the passageway, two water-cooled seating rings in the valve body, one bearing against the confronting face of each of the inner end plates, said rings being insertable and removable through said extension, a removable bonnet on the end of the extension sealed thereto, valve stem means passing through the bonnet, a valve disk to which the stem means is attached movable from a closed position between the two seating rings to an open position in the extension and bonnet, an outside plate spaced from the two annuli and the central plate extending between the two flange plates and welded thereto to form a cooling water space, said extension passing through said last-named plate at the top of the body and being welded thereto whereby the water-circulating space is divided where the extension passes up through it, and means for introducing cooling water into and removing it from said space.

9. A gate valve as defined in claim 8 in which there is a block in the bottom of the outer plate extending to and welded to the inner central plate to provide a partition across the cooling water space, said water-cooled seating rings each having two pipe connections thereon passing through the block, one for supplying water to the ring and one each for removing water from the ring, the block having sealing glands about each of said pipes, the means for introducing cooling water into the water-cooling space being at one side of the block and the means for removing it from said space being at the other side of the block.

References Cited by the Examiner

UNITED STATES PATENTS

| | | | |
|---|---|---|---|
| 587,107 | 7/1897 | Sherrerd | 251—203 X |
| 769,831 | 9/1904 | Agden | 251—328 |
| 1,669,022 | 5/1928 | Root | 137—375 X |
| 1,918,430 | 7/1933 | Schlotmann | 137—340 |
| 2,331,465 | 10/1943 | Fox | 137—340 |
| 2,900,995 | 8/1959 | Dickerson et al. | 137—340 |

FOREIGN PATENTS

| | | |
|---|---|---|
| 635,997 | 1/1928 | France. |
| 908,399 | 4/1954 | Germany. |
| 915,133 | 7/1954 | Germany. |

M. CARY NELSON, *Primary Examiner.*

S. SCOTT, *Assistant Examiner.*